Figure 1:
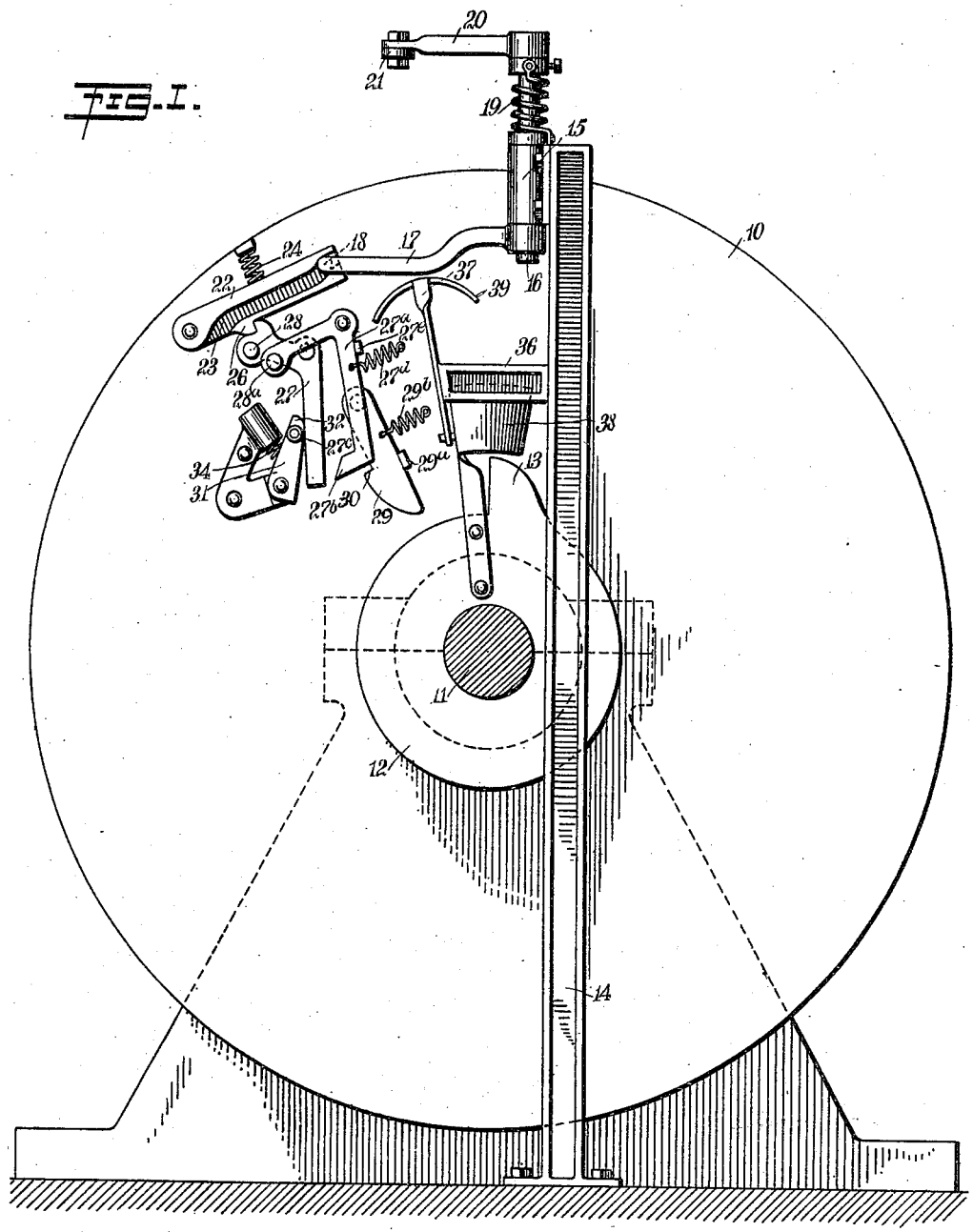

A. E. H. J. THOELLDEN.
INTERMITTENT DRIVING MECHANISM.
APPLICATION FILED MAR. 25, 1910.
987,509.
Patented Mar. 21, 1911.
3 SHEETS—SHEET 2.
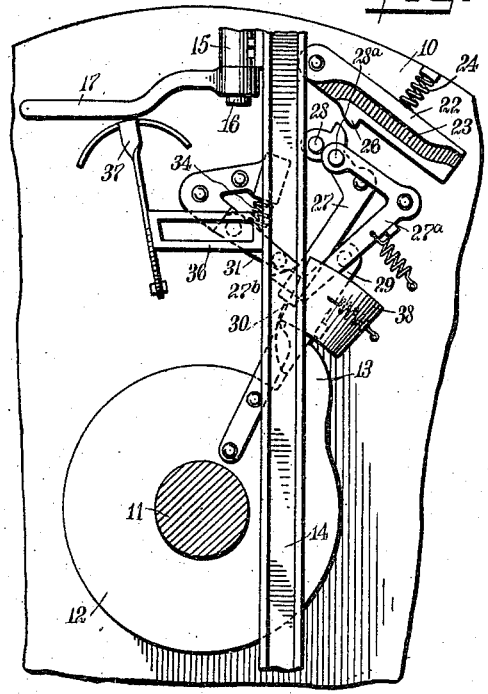
Fig. 2.
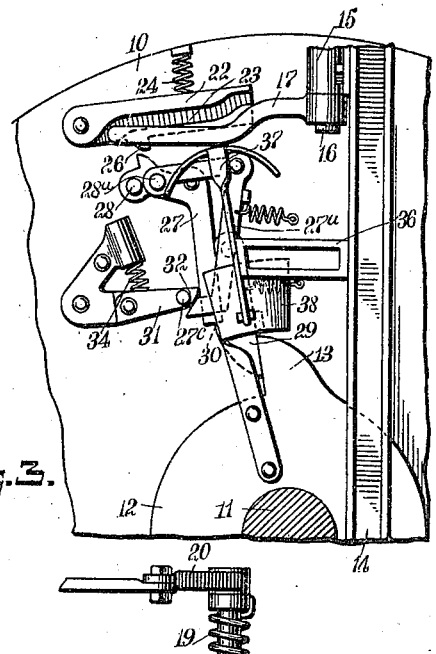
Fig. 3.
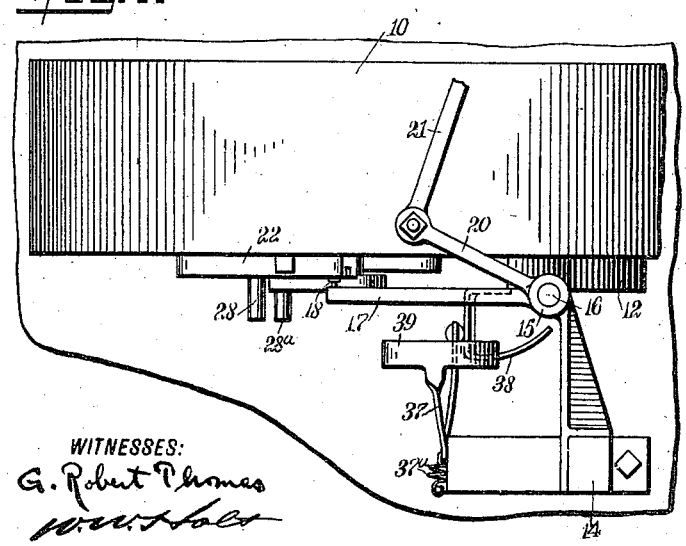
Fig. 4. Fig. 5. Fig. 6.
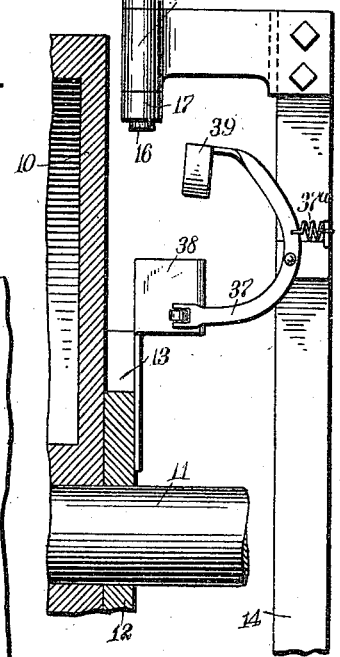
WITNESSES:
G. Robert Thomas
INVENTOR
Anton E. H. J. Thoellden
BY
ATTORNEYS A. E. H. J. THOELLDEN.
INTERMITTENT DRIVING MECHANISM.
APPLICATION FILED MAR. 25, 1910.
987,509.
Patented Mar. 21, 1911.
3 SHEETS—SHEET 3.
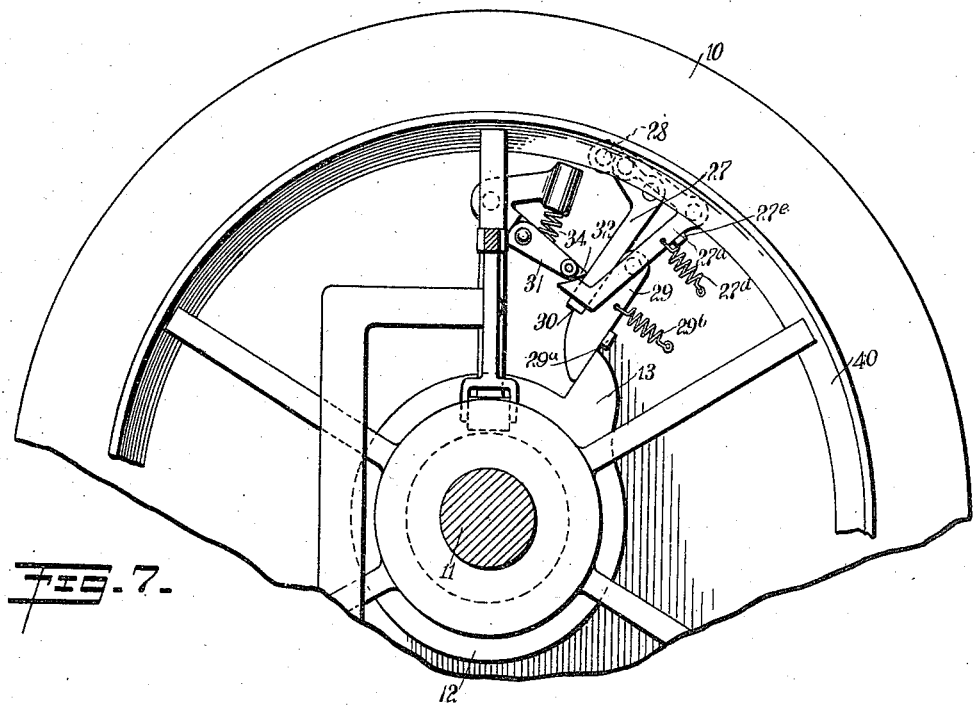
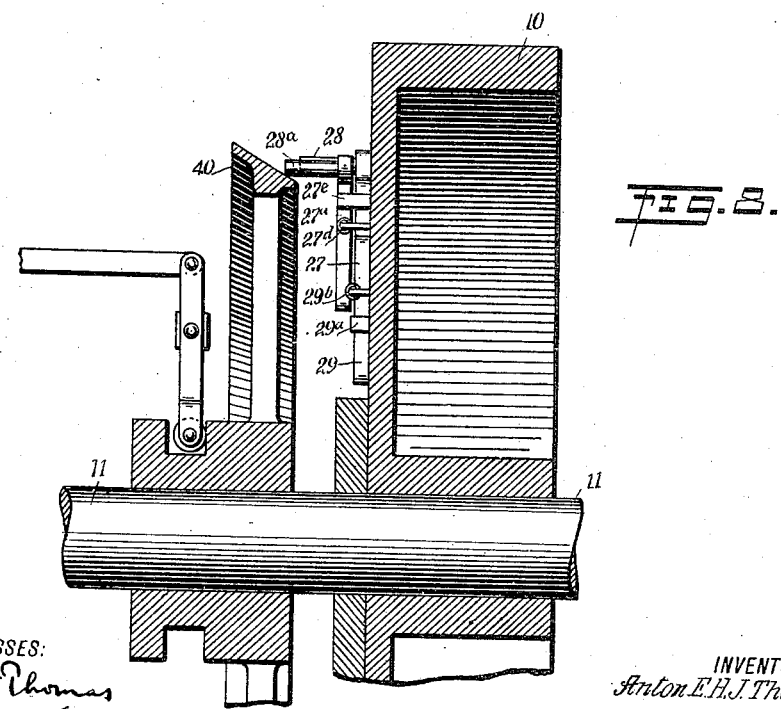
WITNESSES:
INVENTOR
Anton E. H. J. Thoellden
BY
ATTORNEYS

UNITED STATES PATENT OFFICE.

ANTON E. H. J. THOELLDEN, OF NEW HAVEN, CONNECTICUT.

INTERMITTENT DRIVING MECHANISM.

987,509.　　　　Specification of Letters Patent.　　Patented Mar. 21, 1911.

Application filed March 25, 1910. Serial No. 551,464.

*To all whom it may concern:*

Be it known that I, ANTON E. H. J. THOELLDEN, a citizen of the United States, and a resident of New Haven, in the county of New Haven and State of Connecticut, have invented a new and Improved Intermittent Driving Mechanism, of which the following is a full, clear, and exact description.

The invention is an improvement in intermittent driving mechanisms for machines in general, and has in view a rotary driving member and a rotary driven member mounted closely adjacent, with the driving member having a driving dog pivoted thereto to swing into engagement with the driven member, and a mechanism to lock the dog in operative position, respectively released from and engaged with the dog at predetermined periods by independent devices.

Reference is to be had to the accompanying drawings forming a part of this specification, in which similar characters of reference indicate corresponding parts in all the views.

Figure 1 is a side view of a driving mechanism constructed in accordance with my invention, the main shaft being shown in section and the driving and locking mechanism in a position preparatory to engaging the driven member; Fig. 2 is a fragmentary side elevation, showing the driving-dog released and locked in engagement with the driven member; Fig. 3 is a fragmentary view similar to Fig. 2, showing the parts in a position preparatory to the release of the driving-dog; Fig. 4 is a plan of the driving mechanism; Fig. 5 is a fragmentary central vertical longitudinal section; Fig. 6 is a fragmentary view, showing the actuating roller of the locking lever in section; Fig. 7 is a view similar to Fig. 2, showing a modified form of the construction; and Fig. 8 is a central vertical longitudinal section of the invention as shown in Fig. 7.

A driving wheel 10, in the nature of a pulley or driven in any other suitable way, is journaled on a main shaft 11, closely adjacent to a wheel or equivalent member 12, which is suitably fixed to the main shaft and provided with a tooth or like device 13, presenting a shoulder.

A standard or other suitable support 14, is arranged near the wheel 10 and carries a bearing 15, in which is journaled a vertical shaft 16, having an attached actuating arm 17, which, as best shown in Figs. 1 and 6, carries at the inner side thereof adjacent to its outer end an actuating roller 18, the shaft 16 carrying a spring 19, normally forcing it in a direction to carry the roller away from the wheel 10, and is further provided with an arm 20 by which it is operated through a link 21 from any suitable source not illustrated in the drawings as it forms no part of the invention to swing the roller 18 against the tension of the spring 19 into operative position with respect to a locking lever 22, and in proper sequence with the revolution of the wheel 10. The locking lever 22 is constructed with an under-cut cam groove 23, conforming to the taper of the roller 18, with the groove entering one end of the lever and passing out near the opposite end thereof at the inner side near the pivot, the lever being normally forced to a depressed position by a spring 24, and having a catch 26 at the inner side arranged to engage with a shoulder near one end of a driving lever 27. The roller 18, as shown in Fig. 6, is slidable to and from the arm 17 on the pin on which it is journaled, and is normally forced to its outer position by a spring 18$^a$, this manner of mounting the roller adapting it to yield should the roller be slightly out of alinement with the cam groove. The driving-lever 27 is of bell-crank form and pivoted near its angle to the wheel 10, with the outer arm of the lever having an actuating pin 28, projecting outwardly. The inner arm of the driving lever is designed to extend along and serve as an abutment at the inner edge of a driving dog 29, the dog being fulcrumed to the wheel 10 to swing into engagement with the shoulder presented by the tooth 13, and having a heel or shoulder 30, arranged to engage the inner end of the driving lever 27 when the latter is released from the locking lever, as shown in Figs. 2 and 3. Thus, the strain on the dog, tending to swing it out of engagement with the tooth, is transmitted along the length of the driving lever to its pivot. To insure the engagement of the driving lever with the driving dog and retain the former in locking position, I provide a locking dog 31, the same having its point rounded at the inner edge, as indicated at 32, so that a pressure on the driving lever 27, tending to swing the latter upwardly from engagement with the driving dog, will also swing the locking dog on its pivot from the position shown in Fig. 3 to that shown in Fig. 1, the locking dog being held in its locking position, as shown in Fig. 3, by a spring 34.

A releasing lever 27ª, preferably of bell-crank form, is fulcrumed at its angle to the wheel 10, and is arranged slightly outwardly from and in advance of the driving lever 27. The inner end of the releasing lever is provided with a laterally-extending toe 27ᵇ having a beveled edge arranged, when the parts are in driving position, directly under a roller or pin 27ᶜ, projecting outwardly from the side of the locking dog 31. The outer arm of the releasing lever is provided with an actuating pin 28ª, which, in the form of my invention shown in Figs. 7 and 8, is slightly longer than the pin 28. The driving dog 29 is forced to operative position against a stop 29ª, carried by the wheel 10, by a spring 29ᵇ, and the releasing lever 27ª is likewise forced against a stop 27ᵉ by a spring 27ᵈ. These springs and stops although preferable, to insure a positive action of the mechanism, are not essential to the construction, as the lever and dog will swing to operative position under the influence of gravity.

A suitable support 36, shown in the present embodiment of the invention to be a laterally-extending arm of the standard 14, carries a cam lever 37, the lever being fulcrumed intermediate its length, and, as best shown in Figs. 4 and 5, has its inner end arranged operatively with respect to a cam 38, in which position the lever is yieldingly retained by a spring 37ª, the outer end of the lever being provided with a cam 39 arranged operatively with respect to the actuating pin 28 of the driving lever and the actuating pin 28ª of the releasing lever, the cam 38 being suitably attached to the wheel 12.

Assuming the parts of the driving mechanism to be in the position shown in Fig. 1, in which the actuating arm 17 has been moved against the tension of the spring 19 to a position in which the roller 18 will pass into the cam groove of the locking lever, just before the roller reaches the point shown in Fig. 3, the locking lever is lifted, releasing the catch from the driving lever, which is forced into driving engagement with the driving dog, under the influence of the spring-pressed locking dog, the latter taking the position shown in Fig. 3, in locking engagement with the driving lever. The wheel 12 and shaft 11 to which it is attached now move together with the wheel 10 until the cam lever 37 is reached. The cam 39 of this lever at this time is thrown into the path of the actuating pins of the releasing lever 27ª and driving lever 27 respectively, by the engagement of the inner end of the lever with the cam 38. As the pins 28ª and 28 successively bear against the cam 39 in the revolution of the wheel 10, the releasing lever is first lifted and engages the roller 27ᶜ, throwing out the locking dog, after which the driving lever is thrown out of engagement with the driving dog and returned into locking engagement with the catch 26. The driving dog is then free to swing out of engagement with the shoulder of the tooth 13. The wheel now makes one or more revolutions, according to the operation of the arm 17, without driving the wheel 12 and shaft 11, the momentum of these intermittently-driven parts being sufficient when released by the cam lever 37, to move from the releasing position to the point from which the driving action takes place. It is obvious that if the construction in which my invention is used is of such character that the revolution of the main shaft will cease at the instant of the release of the driving dog, the wheel or other driven member 12 may be provided with additional teeth, or the cam lever 37 moved to a point near the point of engagement of the driving dog.

In Figs. 7 and 8 I have shown a slightly modified form of the invention, the same being in all respects similar to the invention as described, with the exception of the cam lever 37 and cam 39, which are replaced by a cam wheel 40, slidable on the main shaft 11 and actuated at proper periods to successively engage the actuating pins 28 and 28ª of the driving lever and releasing lever respectively, and operate them in the same manner as the cam 39.

Having thus described my invention, I claim as new and desire to secure by Letters Patent:

1. In an intermittent driving mechanism, a rotary driving member, a rotary driven member mounted closely adjacent to the driving member, with the driving member having a driving dog pivoted thereto to swing into engagement with the driven member, a mechanism to lock the dog in operative position, carried by the driving member, and independent devices respectively adapted to release the mechanism from and engage it with the dog.

2. In an intermittent driving mechanism, a rotary driving member, a rotary driven member having a shoulder, a driving dog pivoted to the driving member to swing into engagement with the shoulder of the driven member, and means to intermittently lock the dog in operative position and release it during the revolution of the driving member.

3. In an intermittent driving mechanism, the combination of a rotary driving member, a rotary driven member, a dog fulcrumed to the driving member and arranged to swing into engagement with the driven member, a driving lever fulcrumed to the driving member and arranged to swing into engagement with the dog and serve as an abutment therefor when the dog is in driving position, a spring-pressed locking dog arranged to force the driving lever against the driving dog, a locking lever fulcrumed to the driving member and having a catch, and means to engage the driving lever during the revolution of the driving member and force it and the locking dog out of locking position and engage it with the catch of the locking lever.

4. In an intermittent driving mechanism, a driving member, a driven member, releasable means to drive the driven member from the driving member, a locking lever fulcrumed to the driving member and having a catch arranged to engage the said means and retain it in inoperative position, and means arranged in the path of the locking lever adapted to swing it to a position to disengage the said catch.

5. In an intermittent driving mechanism, a rotary driving member, a rotary driven member, means to drive the driven member from the driving member, normally pressed to operative position, a locking member to retain the said means in inoperative position, a tripping device arranged to release the locking member at a prescribed point, and means arranged to reëngage the locking means with the locking member at another point.

6. In an intermittent driving mechanism, a rotary driving member, a rotary driven member, means carried by the driving member normally forced into driving engagement with the driven member, a locking lever having a catch arranged to retain said means in inoperative position and provided with a cam, and a device arranged to engage the said cam to swing the lever in a direction to disengage the catch.

7. In an intermittent driving mechanism, a rotary driving member, a rotary driven member, means carried by the driving member movable into driving engagement with the driven member, a locking lever having a catch arranged to hold the said means in inoperative position and provided with a cam groove, and an oscillatory arm having a roller movable into the path of the groove and releasing the said catch.

8. In an intermittent driving mechanism, a rotary driving member, a rotary driven member, means carried by the driving member movable into driving engagement with the driven member, a locking lever having a catch arranged to hold the said means in inoperative position and provided with a cam groove, an oscillatory arm having a roller movable into the path of the groove and releasing the said catch, and a spring normally tending to return the arm to inoperative position.

9. In an intermittent driving mechanism, a rotary driving member, a rotary driven member, means to engage the driven member and cause it to revolve with the driving member, a locking member arranged to retain the said means in inoperative position, a device to release the locking member from the said means, a cam lever having a cam to engage said means and reëngage it with the locking member, and a cam carried by the driven member arranged to force the said lever into operative position.

10. In an intermittent driving mechanism, a rotary driving member, a rotary driven member, means to engage the driven member and cause it to revolve with the driving member, a locking member arranged to retain the said means in inoperative position, a device to engage the locking member and release said means at a predetermined point, and a cam arranged to engage the said means and reëngage it with the locking member.

11. In an intermittent driving mechanism, the combination of a driving member, a driven member having a shoulder, a driving dog fulcrumed to the driving member and arranged to swing into engagement with the shoulder, a locking lever having a catch and a driving lever fulcrumed to the driving member, means normally tending to force the driving lever into driving engagement with the driving dog, and means arranged to engage the driving lever with the catch, whereby the driving lever is retained in inoperative position.

12. In an intermittent driving mechanism, a driving member, a driven member, releasable means to drive the driven member from the driving member, a locking lever having a catch to engage the said releasable means and retain it in inoperative position and provided with a cam groove, and an oscillatory arm having an inwardly-yielding roller to swing the locking lever in a direction to disengage the said catch, movable into the path of the said groove.

13. In an intermittent driving mechanism, a rotary driving member, a rotary driven member having a shoulder, a driving dog fulcrumed to the driving member and arranged to swing into engagement with the shoulder, a locking arm having a catch, a locking dog, a driving lever fulcrumed to the driving member and arranged to alternately be engaged by the catch to be held in inoperative position and to engage the driving dog, and a spring tending to force the dog against the driving lever and press the driving dog to the said shoulder.

14. In an intermittent driving mechanism, a shaft, a rotary member journaled on the shaft, a rotary member fixed to the shaft, a driving dog carried by the driving member and arranged to swing into driving engagement with the driven member, a locking lever having a catch, and a bell-crank driving lever having one of its arms arranged to be engaged by said catch and held in inoperative position and its other arm arranged to move into driving engagement with the driving dog when the lever is released from the catch.

15. In an intermittent driving mechanism, a shaft, a rotary member journaled on the shaft, a rotary member fixed to the shaft, a driving dog carried by the driving member and arranged to swing into driving engagement with the driven member, a locking lever having a catch, a bell-crank driving lever having one of its arms arranged to be engaged by said catch and held in inoperative position and its other arm arranged to move into driving engagement with the driving dog when the lever is released from the catch, a spring-pressed locking dog carried by the driving member and arranged to bear against the driving lever and lock it in driving engagement with the dog, and means to engage the driving lever and engage it with the catch and throw out the locking dog.

16. In an intermittent driving mechanism, a rotary driving member, a rotary driven member having a shoulder, a dog fulcrumed to the driving member and arranged to swing into engagement with the shoulder, a locking lever carried by the driving member and having a catch, a locking dog carried by the driving member, a driving lever fulcrumed to the driving member and oscillated to alternately be engaged by the catch by which it is held in inoperative position and to engage the driving dog, a releasing lever fulcrumed to the driving member and arranged to engage the locking dog and throw the latter from engagement from the driving lever, and means to operate the releasing lever and driving lever in successive order.

In testimony whereof I have signed my name to this specification in the presence of two subscribing witnesses.

ANTON E. H. J. THOELLDEN.

Witnesses:
ALBERT McC. MATHEWSON,
CHAS. OPPE.

---

Copies of this patent may be obtained for five cents each, by addressing the "Commissioner of Patents, Washington, D. C."